United States Patent
Sprenger

(10) Patent No.: US 10,630,474 B2
(45) Date of Patent: Apr. 21, 2020

(54) METHOD AND SYSTEM FOR ENCRYPTED DATA SYNCHRONIZATION FOR SECURE DATA MANAGEMENT

(71) Applicant: Thorsten Sprenger, Munich (DE)

(72) Inventor: Thorsten Sprenger, Munich (DE)

( * ) Notice: Subject to any disclaimer, the term of this patent is extended or adjusted under 35 U.S.C. 154(b) by 121 days.

(21) Appl. No.: 15/128,613

(22) PCT Filed: Mar. 24, 2015

(86) PCT No.: PCT/EP2015/056204
§ 371 (c)(1),
(2) Date: Sep. 23, 2016

(87) PCT Pub. No.: WO2015/144672
PCT Pub. Date: Oct. 1, 2015

(65) Prior Publication Data
US 2017/0111172 A1    Apr. 20, 2017

(30) Foreign Application Priority Data
Mar. 25, 2014    (EP) .................................... 14161428

(51) Int. Cl.
| | | |
|---|---|---|
| *H04L 9/12* | (2006.01) | |
| *H04L 9/08* | (2006.01) | |
| *H04L 9/32* | (2006.01) | |
| *H04L 29/06* | (2006.01) | |
| *H04L 29/08* | (2006.01) | |

(52) U.S. Cl.
CPC .............. *H04L 9/12* (2013.01); *H04L 9/0822* (2013.01); *H04L 9/0825* (2013.01); *H04L 9/0833* (2013.01); *H04L 9/3242* (2013.01); *H04L 63/0442* (2013.01); *H04L 63/06* (2013.01); *H04L 63/123* (2013.01); *H04L 67/1095* (2013.01); *H04L 2463/061* (2013.01)

(58) Field of Classification Search
CPC ......... H04L 9/12; H04L 63/06; H04L 63/123; H04L 63/0442; H04L 9/0833; H04L 9/0825; H04L 9/3242; H04L 9/0822; H04L 2463/061; H04L 67/1095
See application file for complete search history.

(56) References Cited

U.S. PATENT DOCUMENTS

| | | | | |
|---|---|---|---|---|
| 5,812,793 | A * | 9/1998 | Shakib | .................. H04L 29/06 707/999.008 |
| 6,785,390 | B1 * | 8/2004 | Hiraide | ............... H04L 63/0428 380/262 |
| 7,529,780 | B1 * | 5/2009 | Braginsky | ......... G06F 17/30176 |
| 7,730,543 | B1 | 6/2010 | Nath | |
| 8,572,757 | B1 | 10/2013 | Stamos | |
| 8,589,680 | B2 | 11/2013 | De Atley | |

(Continued)

*Primary Examiner* — Cheng-Feng Huang
(74) *Attorney, Agent, or Firm* — Kowert Hood Munyon Rankin and Goetzel PC; Jeffrey Hood

(57) ABSTRACT

A method for encrypted data synchronization, wherein the method includes providing at least one data entity (100) including data content (110), accompanying metadata (120) including an entity key (140) usable for encrypting the data content (110), and synchronization metadata (130) usable for synchronizing the at least one data entity (100) between at least two first devices (400), wherein at least the entity key (140) of the accompanying metadata (120) and the synchronization metadata (130) are encrypted using a second key.

13 Claims, 4 Drawing Sheets

(56) References Cited

U.S. PATENT DOCUMENTS

Figure 1:
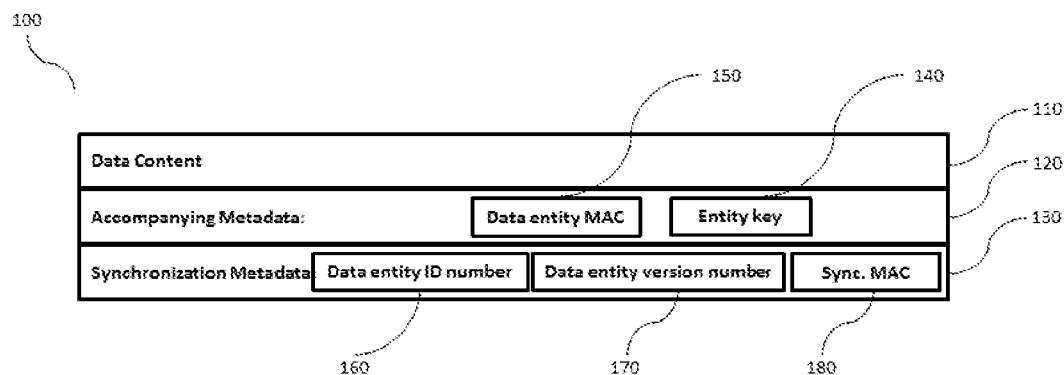

| | | | | |
|---|---|---|---|---|
| 2003/0081790 A1* | 5/2003 | Kallahalla | ............ | G06F 21/6218 |
| | | | | 380/281 |
| 2003/0208686 A1* | 11/2003 | Thummalapally | ........................... | |
| | | | | G06F 21/6218 |
| | | | | 713/193 |
| 2003/0226007 A1* | 12/2003 | Olson | .................... | G06F 21/57 |
| | | | | 713/150 |
| 2004/0151324 A1* | 8/2004 | Furukawa | ......... | G11B 20/00086 |
| | | | | 380/281 |
| 2005/0015471 A1* | 1/2005 | Zhang | ................. | H04L 63/0442 |
| | | | | 709/221 |
| 2008/0147820 A1* | 6/2008 | Maeda | ................... | H04L 9/0858 |
| | | | | 709/213 |
| 2008/0168072 A1* | 7/2008 | Freedman | ............ | H04L 67/1095 |
| 2008/0168126 A1* | 7/2008 | Freedman | ............ | H04L 67/1095 |
| | | | | 709/202 |
| 2009/0282243 A1* | 11/2009 | Rose | ................... | H04L 63/0435 |
| | | | | 713/159 |
| 2009/0282253 A1* | 11/2009 | Rose | ................... | H04L 63/0435 |
| | | | | 713/172 |
| 2011/0252236 A1* | 10/2011 | De Atley | ............ | G06F 11/1464 |
| | | | | 713/168 |
| 2012/0237033 A1* | 9/2012 | Tanaka | ................... | H04W 12/04 |
| | | | | 380/270 |
| 2014/0188803 A1* | 7/2014 | James | ............... | G06F 17/30174 |
| | | | | 707/638 |
| 2014/0331140 A1* | 11/2014 | Maxwell | .................... | G06F 8/34 |
| | | | | 715/734 |
| 2015/0249647 A1* | 9/2015 | Mityagin | ................ | H04L 63/10 |
| | | | | 713/168 |

\* cited by examiner

METHOD AND SYSTEM FOR ENCRYPTED DATA SYNCHRONIZATION FOR SECURE DATA MANAGEMENT

1. TECHNICAL FIELD

The present invention relates to a method and system for encrypted data synchronization between devices for secure data management.

2. TECHNICAL BACKGROUND

The growing number of personal computing devices ranging from smartphones to personal desktop computers as well as the ever-expanding amount of personal data induces the need to have this data accessible all day on many different devices. Additionally, any data or changes done on one device should be reflected on all other devices used by that person.

While the data is stored locally on one of these devices, remotely on any storage hub, or while being in transit, strong encryption should assure the highest possible level of confidentiality without the need to trust any third involved party (e.g., the storage or network provider). This should also include any metadata used for managing, synchronizing or sharing this data between devices.

Furthermore, one should be able to detect and recover from unauthorized modifications or the destruction of the personal data.

Besides having all personal data on all devices it is desirable to also temporarily share a dedicated subset of the data with other individuals. These individuals should be able to access the data but, at the same time, being unable to modify it while maintaining all protective aspects.

Known synchronization solutions are mostly an integrated part of different products, thus providing access to the products data on several devices. The synchronization itself typically uses simple metadata comparison in order to identify the most up to date version of a single synchronized data entity. Other solutions are based on file system synchronization, where the metadata solely consist of the typical file system information, like name and modification date. This approach is used, e.g. by products such as rsync.

Other solutions store the managing data as an additional data entity and therefore being able to use a more detailed set of metadata to provide better and more stable synchronization including information about entity version, history and conflict handling. This single managing data entity has to be read upon each synchronization cycle in order to decide which data entities have to be synchronized or not.

Depending on the synchronization service or storage provider, the communication channel might be encrypted. Nevertheless, the locally and remotely stored data entities are still kept unencrypted in the known solutions.

Several solutions also provide a means to share a subset of the data with other individuals. Any access and modification restrictions, however, solely rely on the technical capabilities of the service or storage provider. Such a service is provided, e.g. by DROPBOX™.

Due to increasing privacy concerns, additional solutions have recently evolved, providing data encryption on top of the aforementioned synchronization solutions. Basic synchronization algorithms handle the data entities as undefined binary objects with associated metadata, used for the synchronization. In special cases, the single managing data entity is also encrypted in itself, but it must still be read completely and then being decrypted in order to perform a synchronization cycle. This technology is used, e.g. by DEVONTHINK™ and SYNCANY™.

If sharing is not part of the solution, a symmetric encryption algorithm is typically used for protecting the data. Using a global master key, either derived or randomly chosen, entity keys are used for the actual encryptions which are then protected by the master key. For a solution with sharing support, mostly a hybrid encryption concept is used, wherein the entities itself are encrypted using a symmetric encryption algorithm and the randomly chosen entity key is protected with the public keys of an asymmetric encryption algorithm for each identity, to which access should be granted. This sharing technology is used, e.g. by Boxcryptor.

All known solutions, however, suffer from a number of drawbacks:

Most synchronization solutions do not provide any kind of data level encryption. In best case the encryption is solely provided on the communication channel itself, whereas the data is stored in unencrypted form. Thus, the user is required to fully trust the synchronizing storage provider. The same applies to known sharing functionality as the access limitations depend on the technical capabilities of a provider and its correct implementation.

Some solutions with data content encryption do not comprise any modification protection. This allows for undetected manipulation of encrypted data with differing success probability depending on the actual protection scheme used. Most critical is the commonly unprotected metadata which is used for managing the synchronization. While this will allow for unhindered efficient synchronization operations it also enables several kinds of manipulations, including undetected reinsertion of already outdated content, permanent data destruction, or fatal synchronization state disruption.

When using a single encrypted data entity to hold the relevant metadata, it will protect against several manipulation techniques. But with elapsing time and growing amount of data entities to synchronize, the managing entity will grow up to a point where a synchronization cycle will take too long to be usable. Additionally, a single entity is also a critical point for being disrupted. It can be destroyed or an outdated version can be reinserted.

Encryption solutions, as proposed by U.S. Pat. No. 8,589,680 B2 that provide sharing make use of asymmetric encryption (public-private key pairs) algorithms to grant access to data for specific individuals, identified by their public key. The data entity encryption key is protected with the public key of each individual which should have access. But either no further validation and protection mechanism is used or no standards are in place, which would allow any known user to digitally sign a created data entity. This enables individuals to also change the data in question or to recreate new data without detection. Thus, a read-only sharing solution is not realizable.

US patent application publication US 2013/0283060 A1 proposes a way of sharing privately the encrypted use of data that is stored remotely from an owner of the use of data. A request to share the privately encrypted data with a set of authorized persons may be received. A private encryption key may be received where the private encryption key is managed by the owner of the use of data.

In summary, none of the above discussed solutions are designed to provide an efficient synchronization mechanism supporting read-only access while providing security by fully encrypting the data entities.

It is therefore technical problem underlying the present invention to provide an improved way of efficiently synchronizing encrypted data between devices. A further objective addressed by aspects of the present invention is that some of the devices shall only be allowed to have read-only access to shared data.

3. SUMMARY OF THE INVENTION

This problem is solved by a method for encrypted data synchronization. In the embodiment of claim 1, the method comprises:
  a. providing at least one data entity comprising data content, accompanying metadata including an entity key usable for encrypting the data content, and synchronization metadata usable for synchronizing the at least one data entity between at least two first devices;
  b. wherein at least the entity key of the accompanying metadata and the synchronization metadata are encrypted using a second key.

Accordingly, the embodiment facilitates the synchronizing of encrypted data entities that are composed of three parts: data content that holds the actual data (i.e. the "payload", e.g., a text file, picture, or generally any other type of file), accompanying metadata to serve for encrypting the data content, and synchronization metadata to serve for synchronizing the data entity between devices (e.g., computer, laptop, smartphone, or generally any other type of electronic device). At least the entity key of the accompanying metadata as well as the synchronization metadata are encrypted using a key.

The described solution significantly improves the efficiency and security of synchronization. This is because the synchronization metadata is kept apart from other accompanying metadata. This way, it is possible to read the synchronization metadata without the burden of decrypting the complete data entity. In addition, the synchronization metadata only corresponds to one file (i.e. data entity) and therefore, the present invention avoids the requirements of the prior art approaches of having to maintain a global synchronization entity, which be read in order to perform a synchronization cycle. As already explained in the introductory part above, in case of a large number of data entities, a global synchronization entity can easily comprise a large amount of data, so that reading such a global synchronization entity becomes very slow and perhaps even impracticable. Compared to this prior art approach, the present invention is less complex, less time-consuming, decreases the overhead and therefore greatly improves the performance of synchronizing encrypted data entities. In addition, the approach provided by the present invention is also more secure, since the invention avoids a central point of attack for assailants, i.e. the global synchronization entity of the prior art.

In another aspect, the key used for encrypting at least the entity key of the accompanying metadata and the synchronization metadata is a synchronization key and the synchronization key is encrypted by a master key. Such a hierarchical encryption enables the method to send the synchronization key through unsecure channels. Thereby, only the master key must be transferred through a secure channel. Then, the encrypted synchronization key can be communicated to other participating devices through any available communication channel. A potential attacker, who receives the encrypted synchronization key in an unauthorized way, has no possibility to access the encrypted synchronization metadata and the encrypted accompanying metadata or the at least encrypted entity key, because he has no access to the securely communicated master key.

As explained above, the synchronization key can be safely transferred to said user. Therefore, the flexibility of the described method is increased.

In another aspect key is generated and transferred to at least one second device, the group key used for decrypting and encrypting the accompanying metadata of the data entity or used for encrypting and decrypting the entity key. By providing group keys, the method is enabled to grant only read-only access for specific users. Thereby, the accompanying metadata including the entity key or only the entity key is encrypted with the group key. An owner of the group key is therefore able to decrypt the accompanying metadata including the entity key or only the entity key and to retrieve the entity key which is used to decrypt the data content. However, the user has no access to the synchronization data and can therefore not update the data content. Thereby, the group key can be based on a symmetric algorithm (e.g., AES or the like) or on an asymmetric algorithm (e.g., private-public key algorithms or the like).

A further aspect is that at least one of the second devices can form a read-only sharing group with at least one of the first devices. With regard to the above described concept of group keys, the method is enabled to easily create groups in which a user grants read-only access to other specific users. These groups are organized in so-called read-only sharing groups. Each read-only sharing group has its own exclusive group key.

Preferably, a public key of at least one of the first devices and of at least one of the second devices is used to encrypt the group key and where in the public keys (450) are shared between the devices. Sharing the public keys between all participating devices enables the method to locally encrypt the group key and communicate it securely to all participating devices that should have read-only access to specific data entities. The receiving devices are able to decrypt the encrypted group key using their own locally available private key. Therefore, the above mentioned read-only sharing groups can be formed by just communicating the corresponding group keys to the desired users.

In another aspect, the accompanying metadata comprises a message authentication code MAC usable for an integrity check.

Preferably, the MAC is used to check whether the data content has been manipulated by any attackers or unauthorized devices. A MAC-based integrity check allows the method to recognize such a manipulation and therefore the method can react in a proper way, e.g., by reverting or removing the corrupted data entity or at least informing the users that corrupted data has been detected. Furthermore, the MAC may optionally be used to check the integrity of data entity identification number, the data entity version number, the synchronization MAC, and/or of the entity key. It will be appreciated that the present invention is also directed to embodiments comprising the above aspect (as well as the related aspects concerning manipulation detection, version control and/or recovery) without encrypting the entity key, the accompanying metadata, the synchronization metadata and/or the data content, and preferably without any encryption.

In another aspect, the accompanying metadata comprises a delete flag. Said flag enables the method to mark a data entity as deleted without removing it physically from a storage. This allows the method to easily restore previously deleted data without re-transferring it from another participating device.

In yet another aspect, the synchronization metadata comprises a data entity identification number, a data entity version number, and/or a synchronization MAC. The data entity identification number is used to identify a data entity. The data entity version number is used to encode the current version of the data entity. With regard to data synchronization, such a version number allows to detect on which device the most actual version is stored. Preferably, the synchronization MAC is used for checking the integrity of data identification number and/or the data entity version number.

Preferably, the data entity identification number is built from a device identification number and a device counter by concatenating both numbers, e.g., using fixed bit widths for the device identification number and the device counter (i.e., the device identification number is 0011 and the device counter is 0110. A concatenation then results in a data entity identification number 00110110). Optionally, any other kind of combination of the both numbers can be used that result in a unique result compared to other data entity identification numbers that might already exists are might be built for using them for new data entities.

Accordingly, every involved device preferably comprises a unique device identification number and maintains its own device counter. When a new data entity is created on a particular device the corresponding entity identification number is built from the device identification number of the creating device in combination with the device counter. The combination can be concatenation or the like. Afterwards, the device counter is incremented. This results in a unique data entity identification number every time when a new data entity is created, regardless of which device created the data entity.

In another aspect, the data entity version number is built from a device identification number and a counter. Accordingly, the data entity version number is preferably built in a similar way as the data entity identification number. The data entity version number is built from the device identification number on which the data entity was changed on, in combination with a version counter. The version counter is incremented on every change of the data entity. Thus, even when an older version of an entity is reinserted which was changed on another device, the resulting version number defers from the original one, although the version counters might be equal.

Yet another aspect is that the data entities are stored on a server. Storing the data entities on a server allows a fast synchronization between all participating devices. This is because a server has a higher availability than user devices. Since user devices are sometimes turned off, synchronization capabilities are limited. When a device has changed a data entity locally, the actual version of the changed entity is only available to other devices, when the changing device is online and available. When the data entities are stored on a server, the changing device can be off-line or switched off while other participating devices still have access to the actual version of the changed data entity.

Preferably, the device identification numbers and/or the synchronization key are stored as a data entity. Storing the device identification numbers and the synchronization key in the form of a data entity themselves allows to use the same mechanisms to synchronize the device identification numbers and the synchronization key between all participating devices without having to implement further synchronization mechanisms. This leads to a particularly simple and easy to maintain synchronization system.

Preferably, the second key (the synchronization key), the master key, and/or the group key are key sets comprising a plurality of keys. Using more than one key increases the cryptographic strength of the present invention. The reason for that is that the single keys are then used less often for encryption which reduces the chances of a successful cryptoanalytical attack.

The present invention also provides a computer program comprising instructions for performing any of the above described methods.

Lastly, also a system is provided which comprises means for performing any of the above described methods.

4. SHORT DESCRIPTION OF THE FIGURES

In the following detailed description, presently preferred aspects of the invention are further described with reference to the following figures, wherein:

FIG. 1: illustrates the structure of a data entity according to an embodiment of the invention.

Figure 2:
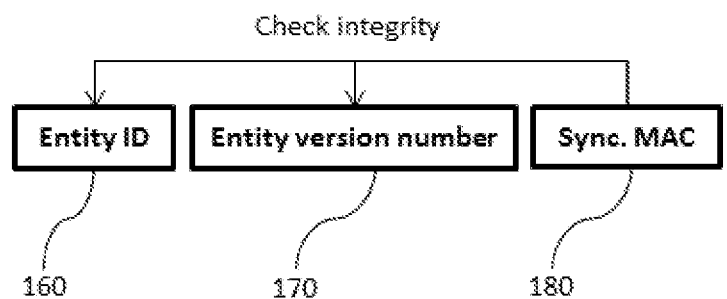

FIG. 2: illustrates the functionality of the synchronization MAC according to an embodiment of the invention.

Figure 3:
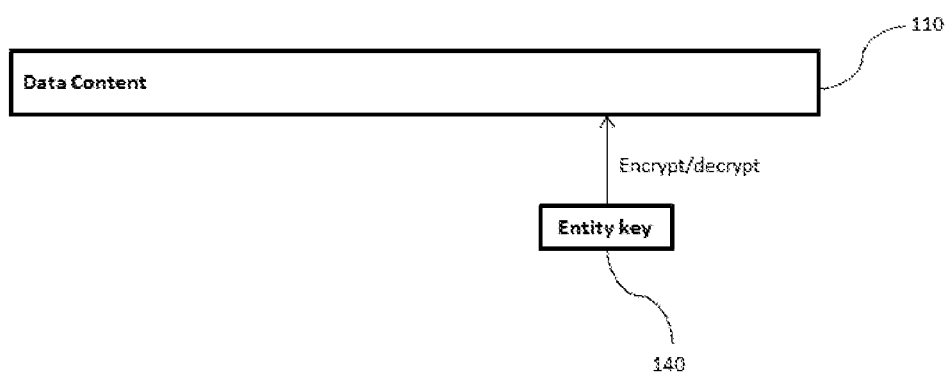

FIG. 3: illustrates the functionality of the entity key according to an embodiment of the invention.

Figure 4:
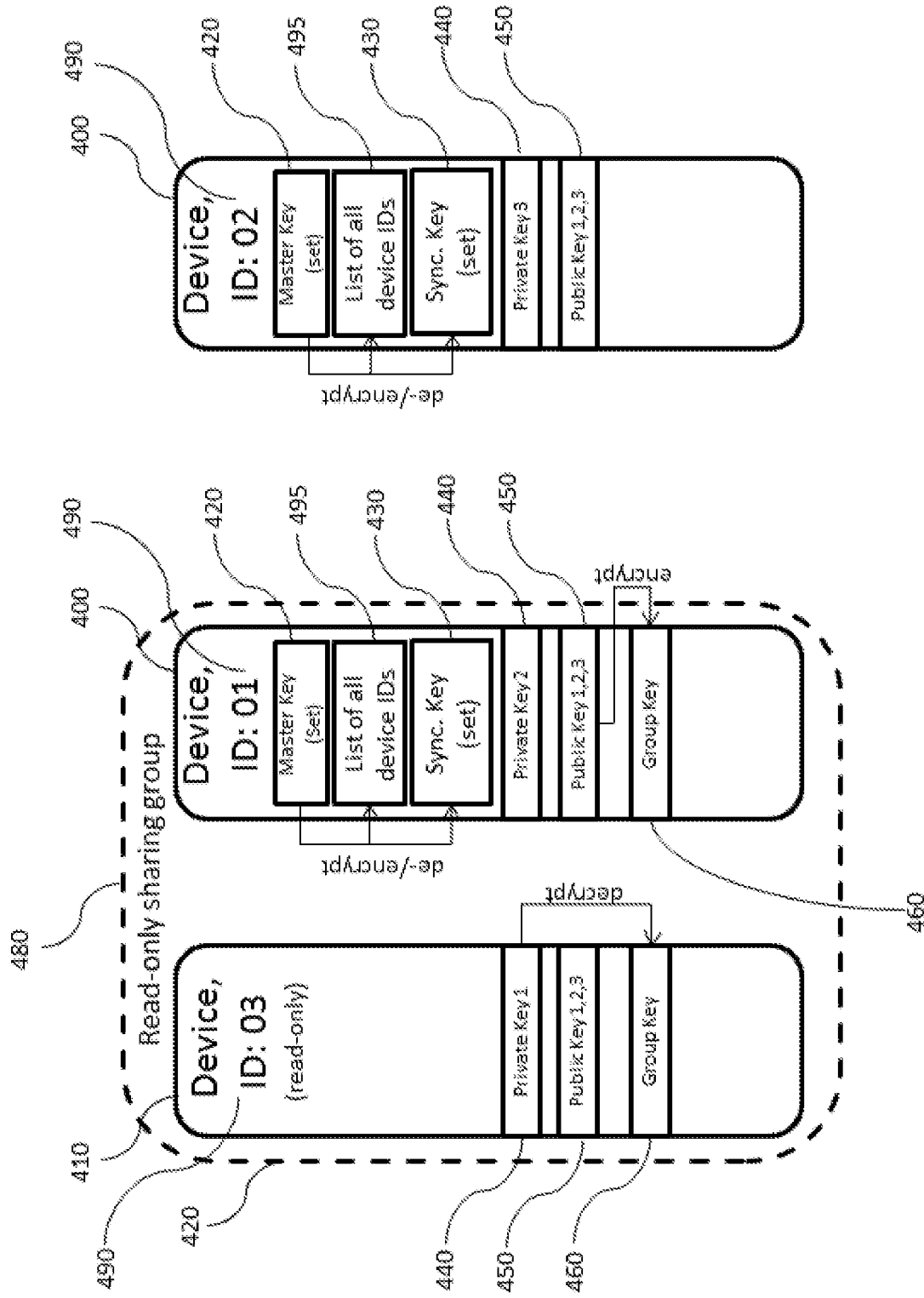

FIG. 4: illustrates the placement of keys among the involved devices according to an embodiment of the invention. Furthermore, it is illustrated which key or key set is used for the encryption of other keys or key sets.

Figure 5:
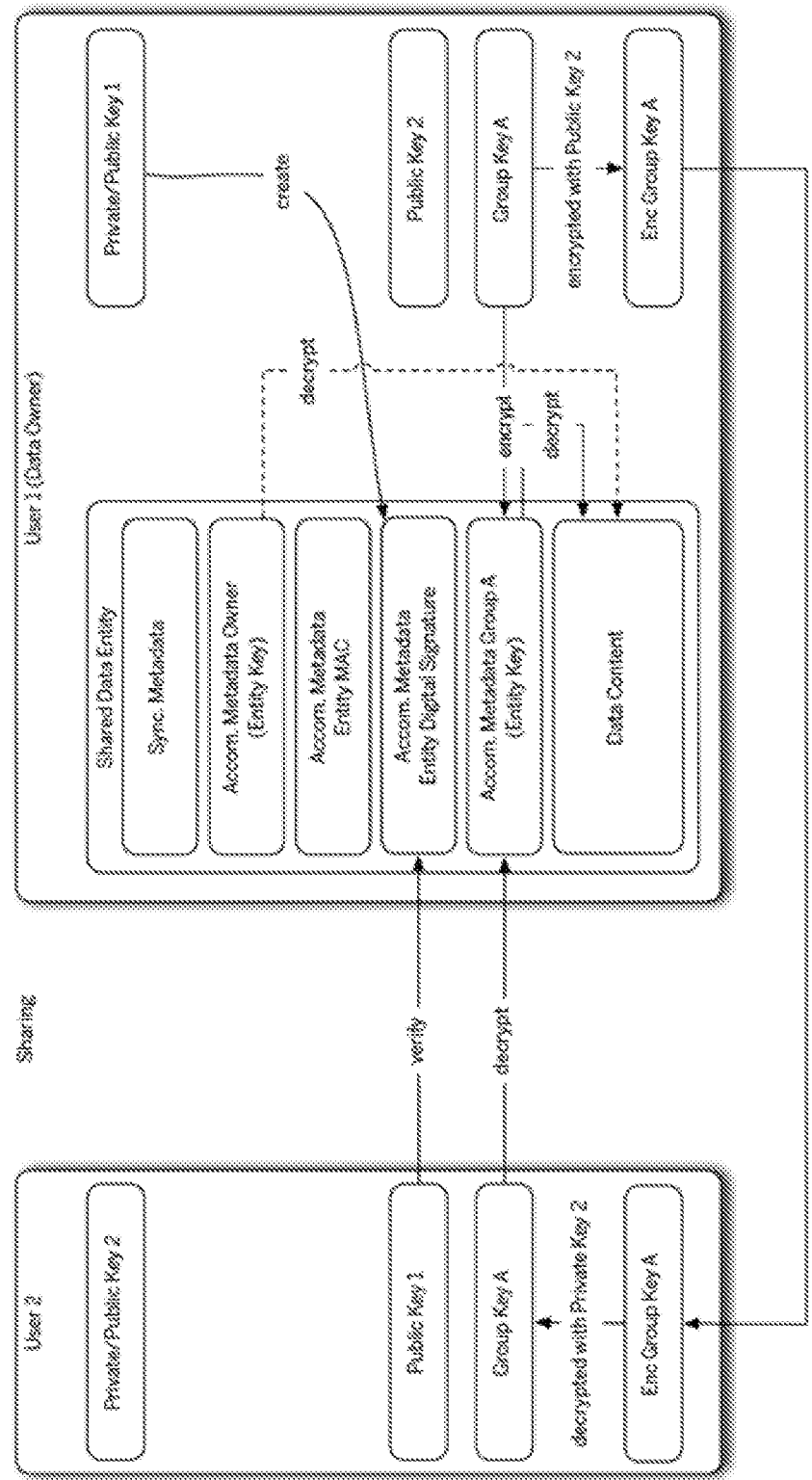

FIG. 5: illustrates the placement of keys in more detail according to an embodiment of the invention. Furthermore, it is illustrated which key or key set is used to encrypt the data content or other key or key sets according to an embodiment of the invention.

Figure 6:
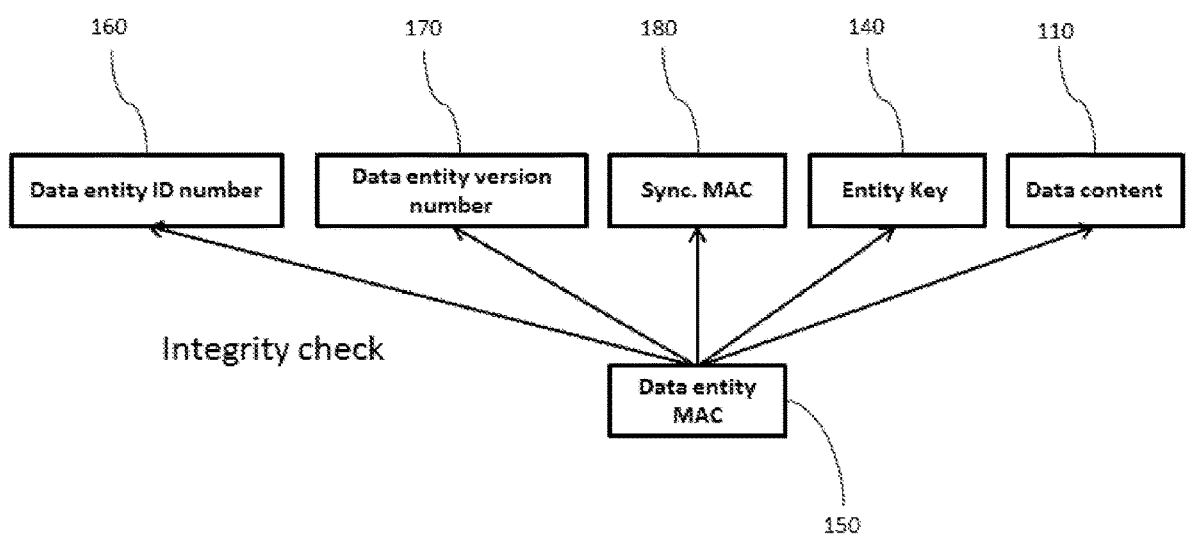

FIG. 6: illustrates the integrity check according to an embodiment of the invention.

5. DETAILED DESCRIPTION OF THE FIGURES

To overcome the limitations of the prior art outlined above, it is preferable not only to encrypt the data content of a data entity, but also to integrate cryptographic primitives into the synchronization metadata in a way to support and protect the synchronization mechanism. This allows evaluating the metadata without the need to load and decrypt the whole data entity. Additionally, it enables the whole method and system to detect and recover from any manipulation. In addition, an efficient synchronization mechanism is provided. Therefore, the core concept of the present invention relates to a mechanism that allows for fast access to the relevant synchronization values, (in a preferred embodiment the data entity identification number and the data entity version number of a data entity), protected against modification using appropriate cryptographic primitives as well as an evaluation mechanism based on the assurance of these values which offer a robust recovery in case of manipulation or destruction of data entities.

As shown in FIG. 1, each data entity 100 to be synchronized is composed of three parts: Data content 110, accompanying metadata 120, optionally divided into several blocks, and synchronization metadata 130. Whereas the data content 110 is not evaluated directly, the accompanying metadata 120 is used for additional data information, data access control, and/or additional data verification. The groups and its values are protected with appropriate cryptographic primitives, using a set of cryptographic keys or key sets and key pairs.

The data content 110 contains the raw data of the data entity (i.e. the "payload") but may also represent more complex structures, including additional information, e.g., modification date, human readable title etc. It is encrypted by using randomly generated entity key 140 for each data entity 100. Optionally, these keys may be reused upon content change or even be shared between several data entities 100. The generation of the entity key 100 is not limited to a random generation, but any other suitable algorithm for key generation (e.g., derived from a password or the like) can be used. Alternatively, the synchronization key 430 or a key from a synchronization key set 430 may be used to encrypt the data content 110. Optionally, the content may be protected using an authenticated encryption scheme, e.g., a dedicated keyed MAC (HMAC, CMAC or the like) or a digital signature (ECDSA and the like).

The synchronization key set can comprises at least one key. To enhance the security regarding cryptographic analysis of the invention, it is recommended, but not necessary, that the key set comprises more than one key, e.g., it can comprise of five 256-Bit keys. The number of keys depends from the used cryptographic algorithms. Some algorithms (e.g., GCM) only need one key, but algorithms like (SIV) are commonly used with two keys. Preferably, different keys should be used for encryption of other keys or key sets, the data content and for the MAC algorithms (e.g., CMAC or the like). But it is also possible to just use one key instead of a whole key set, depending on the cryptographic strength to be achieved.

In case entity specific keys are used, these can be stored within the accompanying metadata 120 or separately. Optionally, the accompanying metadata 120 may also contain additional information concerning the actual content (e.g., modification date, human readable title, content type identifier etc.). The accompanying metadata 120 is encrypted using the synchronization key 430 or a key from the synchronization key set 430. In another aspect, the accompanying metadata 120 is protected using an authenticated encryption scheme, e.g., a dedicated keyed MAC (HMAC, CMAC or the like) or a digital signature (ECDSA or the like). Several accompanying metadata blocks may exist.

In case confidentiality is not required, the encryptions of the data content can be omitted, while keeping the mandatory MACs. This will still provide the manipulation detection and recovery properties. Only the synchronization key or key set (430), if present as special entity, must be encrypted as otherwise, the protection can be circumvented. Pools may be constructed similar to data entities 100, but might optionally only consist of synchronization metadata without any content or accompanying metadata.

In another aspect, data entities 100 can optionally be organized in pools for further synchronization optimization. These pools preferably adhere to the same format and synchronization concept as the data entities 100.

When a new data entity 100 is created, the data entity identification number 160 is built from the device identification number 490 and the actual entity counter of the device 400 the data entity 100 was created on. Preferably, both numbers are concatenated but any other concept of generating a unique data entity identification number 160 is also suitable. The entity counter is incremented after each creation of a data entity 100. As the device identification number 490 is unique among all participating devices and the counter is always incremented, a unique data entity identification number is guaranteed. In case the counter turns to zero, the device will choose a new device ID, as during initialization. The data entity version number 170 is also created using the device identification number 490 but the version counter is set to one. Upon change of a data entity 100, a new version number is calculated. The version counter is incremented and the device identification number 490 within the data entity version number 170 is changed to the device identification number 490 of the device that performed the modification. In case the version counter turns to zero, the data entity 100 is marked as deleted and a newly created data entity with the same content is put in as replacement. Optionally, for an even more robust recovery mechanism, every former data entity version number 170 may be stored within the accompanying metadata 120.

There are also mechanisms in place to guarantee real unique device identification numbers 490 and a special format of the data entity version numbers 170 to be robust against synchronization state disruption in case of a recovery. Each device 400, 410 participating in the synchronization uses a different device identification number 490. A master key 420 or a master key set is created in the beginning and shared between all participating devices 400, 410 (e.g., password based key derivation, smartcard based storage or soft token).

The list of all device identification numbers 495, which comprises all device identification numbers 490 that have been used before or are currently in use, is synchronized between all participating devices 400, similar to the data entity 100 synchronization, but using the master key 420 or the master key set for encryption.

In the same way the synchronization key or key set 430, containing the cryptographic keys used for the cryptographic operations on the data entities 100, is synchronized between all participating devices 400. Optionally, the synchronization key 430 or the synchronization key set might be equal to the master key 420 or the master key set 420. In this case, no synchronization of that key or that key set is necessary. Preferably, to ensure a high cryptographic strength, the master key or key set and the synchronization key or key set are not the same. The master key can be derived from a password (e.g., using the PBKDF2 algorithm or the like) and the synchronization key is randomly generated.

Referring to FIGS. 1 and 2, each data entity 100 contains a synchronization metadata 130 that can be accessed without the need to read the whole data entity 100. This synchronization metadata comprises at least the data entity identification number 160, the data entity version number 170 and a synchronization MAC 180, optionally including more information (e.g., a deleted and/or a shared flag). In addition, a data entity MAC 150 may be included in the synchronization metadata 130. If not stored within the synchronization metadata 130, said data entity MAC 150 can also be stored within the accompanying metadata 120. Both the data entity identification number 160 and the data entity version number 170 might optionally be encrypted separately to protect against metadata analysis. The aforementioned synchronization key 430 or the synchronization key set 430 is used to perform the cryptographic operations needed for the keyed MAC and the optional value encryption.

Referring to FIG. 6, the data entity MAC 150 is calculated over the complete data content 110. Optionally it is additionally calculated over the data entity identification number 160, the data entity version number 170, the synchronization MAC 180, and the entity key 140 (excluding itself if the MAC 150 is part of the synchronization metadata 130 or accompanying metadata 120). The MAC 150 may also be replaced with a digital signature (ECDSA and the like).

The data entity identification number 160 is built from the device identification number 490 on which the entity was created on, combined with the state of the device counter which is incremented each time a new entity is created on the device 400. This mechanism guarantees unique data entity identification numbers in a changing set of participating devices 400. Additionally, optional identifying values are encoded within the data entity identification number 160 to bind this data entity to a defined pool.

The data entity version number 170 is build similar, including the device identification number 490 of the device the entity was changed on while incrementing the actual version counter of the data entity 100 itself. Thus, even upon reinserting an older version of an entity accompanied by another change of this old data entity 100 on a different device 400 will still lead to two different data entity version numbers 170, although the version counters itself might be equal.

The synchronization MAC 180 is used to verify the encompassing values in order to recognize any form of manipulation. An invalid synchronization metadata and its corresponding data entity are ignored for further processing.

The data entity MAC 150, either part of the synchronization metadata 130 or accompanying metadata 120, allows fast data entity verification without the need to decrypt the whole content, in case a data entity 100 has to be loaded onto a device due to a remote change. An invalid data entity 100 is ignored for further processing.

In all situations, the synchronization metadata 130 and upon load or store of a data entity 100 also the complete data entity 100 gets validated using the two MACs 150, 180 stated above. Any data entity that fails these verifications will be removed and the normal synchronization process will automatically recover the latest known valid version from any of the participating devices 400, 410.

All decisions concerning the synchronization, which data entities 100 must either be loaded from or stored onto the remote side can be made by evaluating the data entity identification number 160 and the data entity version number 170. A complete decryption of the data entity 100 has only to take place in case of a concurrent modification, e.g., when a data entity 100 was changed on more than one device, is detected to allow a conflict resolution by merging the changes. Deleted data entities 100 are marked as deleted to avoid reinsertion and to detect a concurrent deletion-modification conflict.

The above-described version-numbering scheme allows the detection of older versions of data entities 100 being reinserted, even after being changed by another device. Optionally, all former data entity version numbers 170 of each data entity 100 can be kept within the data entity 100 to allow detection of the rare case, when a reinserted much older version is modified by a less often synchronized device 400 before a recovery has taken place.

FIG. 3 shows the usage of the entity key 140. This key is used to encrypt the data content 110 of a data entity 100. It is preferably stored inside the accompanying metadata 120. The encryption is commonly based on a symmetric encryption algorithm. In other aspects of the invention, other encryption algorithms can be utilized.

Referring to FIGS. 4 and 5, another advantage of the present invention is the possibility to only grant read-only access for specific individuals (an individual can be the owner or one or more participating devices). This is done without providing access to the master key 420 or synchronization key 430 or to the respective sets. Granting read-only access is achieved by using public-private key pairs while retaining the concept outlined above. Each individual generates its personal public key 450 and private key 440 (e.g., based on Elliptic Curves, RSA or the like) used to identifying him to others. The public keys 450 may be shared via open or near field communication channels, e.g., via email, QR codes, Bluetooth etc. Additionally, a fingerprint mechanism can be used to verify the public key. For each sharing group containing one or more devices of individuals identified by their public key 450, a group key or group key set 460 is created. The key or key set is encrypted using the public key 450 of each individual of the group and signed for verification, using the owner's private key 440. Access is granted by encrypting the accompanying metadata 120, or at least the entity key 140, of each shared data entity 100 also using the group key or key sets 460 of the groups that should have access. Additionally, the data entity 100 is signed, using the owner's private key. This allows every individual of a sharing group to access the content of the data entity 100 and to verify its integrity without being able to create a valid changed version because neither the owner's private key 440, the master key 420 nor the synchronization key 430 (or the respective sets) can be accessed.

The protection and robustness of the present invention is based on several keys and/or key sets like the master key 420 or the synchronization key 430. Each set may contain several different keys. In one aspect of the invention, it is also possible that some or even all keys or all keys of both sets are actually represented by the same or even a single key.

In a further aspect, when a shared data entity 100 is modified, the modifying device has to re-encrypt the accompanying metadata 120 or at least the entity key 140 using one time the synchronization key or key set 430 and the group key or key set 460 of the group that has read-only access to the shared data entity 100.

Following, the shared data entity access is described in more detail. For a data owner to provide read-only sharing of single data entities 100 with third parties, it must be possible to grant content decryption and data entity verification capabilities to a chosen group of identifiable users. Each user therefore needs a public key 450 and a private key 440 (e.g., based on Elliptic Curves, RSA or the like). This key pair of the owner is handled equally as the master key 420 or the master key set 420, generated once and shared between all devices using a dedicated manual, optical or technical channel. Alternatively it can be part of the synchronization key set.

Access groups are defined and for each access group a dedicated but reduced key set is created. For each user, who should be granted access, a dedicated user entity is created, protected and synchronized similar to the data entities 100. The content contains all group information and group keys or group key sets 460 the user is part of. The actual content encryption keys are also encrypted using the users public key 450 and the user entity is signed using the owner's private key 440 to allow validation by the user. Optionally, a group entity for each access group may be used containing information about the shared data entities 100 for that group, to allow fast iteration without the need to load all data entities 100.

Alternatively, pools can be utilized to link the shared data entities 100 to each group whereas each group is represented by a single pool. For each group, which should have access to a data entity 100, the content encryption keys are also encrypted using the group's key set and stored as additional accompanying metadata 120 block. Additionally, the data entity 100 is also signed using the owner's private key 440 to allow entity validation.

In case a data entity 100 should not be shared anymore, the accompanying metadata 120 block with the content encryption keys for that group is removed. The data entity 100 might optionally be reencrypted using a new entity key 140, to provide maximal protection.

If a user is removed from a group, the group keys or the group key set is removed from the specific user entity or the users content encryption key of the group entity. Optionally, for maximal protection, the group key set can be recreated, all existing users of the group get the new key set and all data entities 100, the group has access to, will be re-encrypted.

The current access to load the user, group and data entities 100 depends on the used storage (e.g., FTP read-only account or the like) and will be sent to the invited user by other means (e.g., link within an email or the like).

For having write access, each participating device 400 needs to have access to the same master key 420 or master key set 420. This master key or key set 420 is generated from a password. But any other method for key generation is also possible. The master key 420 or the master key set 420 may be hold locally for ever or for a limited time frame, before the password must be entered again. Alternatively the master key 420 or key set 420 may be generated or derived and shared between all devices 400 using a dedicated manual, optical, or technical channel. The master key 420 or the key set 420 may be shown as alphanumeric representation to be entered manually on another participating device as an optically detectable code (e.g., QR code or bar code) to be scanned by the other device or via other channels (e.g., Bluetooth, email etc.), optionally protected by cryptographic protocols. Other means to provide the same master key 420 or master key set 420 for all devices would be to store it on several physical sub devices (e.g., smartcards) to be used on each participating device.

The synchronization key 430 or the synchronization key set 430 is generated upon initialization by the first device and synchronized using the same mechanism as for the synchronization of the data entities 100. The master key 420 or the master key set 420 is used for the cryptographic operations on this entity.

For each synchronization cycle there exist one active and one passive party. The passive party provides access to the stored data entities 100 whereas the active party is performing the synchronization operations. Normally, the active party is represented by one of the participating devices 400. The passive one is a central storage (e.g., WebDAV server, FTP server, Storage Cloud provider or the like), but may optionally also be another participating device 400. Access to the passive party may be limited and may require login credentials (e.g., username and password and the like) as well as providing a secure communication channel (e.g., SSL and the like). The passive party must provide a means to access the synchronization metadata 130 independently from the accompanying metadata 120 and data content 110 for each data entity 100 (e.g., encoding this as filename on an FTP server or the like).

Additionally, the present invention comprises a mechanism to allow for conditional atomic read and write operations of at least a single data entity 100, meaning a read or write operation may be conditionally bound to the values of the synchronization metadata 130. In case the given values do not comply with the values on the passive party, neither the conditional read nor write operation may succeed. This can be achieved by providing a special message interface (e.g., API of Storage Cloud Providers or the like), using a built-in locking API (e.g., WebDAV or the like) or building a file-based locking mechanism (e.g., FTP or the like). For file-based storages, pools can be represented by a folder structure whereas the synchronization metadata 130 of the pool is encoded in the folders name.

A synchronization cycle starts with reading the synchronization metadata 130 of the remote data entities 100. A verification step denotes the checking of the MAC or the digital signature of the synchronization metadata 130 and in case of loading or storing the data entity 100 also the checking of the data entity MAC 150.

A synchronization of the special entities is performed first. The following cases may occur for any entity:

(A) When the local and the remote data entity 100 do have the same data entity version number 170, nothing has to be done. Optionally, a verification of the remote or local data entity 100 can be performed. If it fails, the data entity 100 will either be treated as a newly created data entity (see following step B) or as an unknown data entity (see following step C).

(B) If a newly created data entity 100 exists locally, it will get stored remotely. In case any verification of the local data entity 100 fails, it will be ignored. When using a deleted data entity 100, the data entity identification number 160 must be checked, too.

(C) If a remote data entity 100 with a locally unknown data entity identification number 160 is detected, the data entity 100 gets loaded and stored locally. In case any verification fails, the data entity 100 will not be processed further. When using a deleted data entity 100, the data entity identification number 160 must be checked, too.

(D) If a remote data entity 100 with a known data entity identification number 160 is detected, having the same data entity version number 170 as the locally stored entity 100 and which is also changed locally, the local copy will be stored remotely under a new data entity version number 170, build as specified above. In case any verification of the local data entity 100 fails, the remote data entity 100 will be treated as unknown data entity 100 (see step C above).

(E) If a remote data entity 100 with a known data entity identification number 160 is detected, having a different data entity version number 170 as the locally stored data entity 100 not having been changed locally, the data entity 100 gets loaded and stored locally. In case any verification of the remote data entity 100 fails, the data entity 100 will be treated as a newly created data entity 100 (see step B above).

(F) If a remote data entity 100 with a known data entity identification number 160 is detected, having a different data entity version number 170 as the locally stored data entity 100 but which is also changed locally, a conflict resolution takes place. This resolution depends on the situation this synchronization technology is used in. There exist two different possibilities:

a. merge both conflicting contents (e.g., done by a business logic) and store the new content under a new data entity version number 170; or b. create two new data entities 100 with new data entity identification numbers 160 for both conflicting contents and mark the former data entity identification number 160 as deleted.

In case any verification of the remote or local data entity 100 fails, the data entity 100 will either be treated as a newly created data entity 100 (see step B above) or as unknown data entity 100 (see step C above). If one of the data entities 100 is marked as deleted, the modified and not deleted variant will be created as a newly created data entity 100.

(G) In case a remote data entity 100 with a version counter below the last recorded locally one is detected, a recovery is performed. The normal behavior is to store the local copy remotely, under a new data entity version number 170 if it was changed locally. To cope with the rare race condition that a replayed data entity 100 (reason for such a recovery situation) was also changed by another seldom synchronized device 400 and still being below the local version counter, it is optionally possible to record all data entity version numbers 170 of a data entity 100 within the accompanying metadata 120. This condition would then be detectable and handled as conflict resolution (see step F above).

Pools may be handled similar to the synchronization cases described above. If a different version number is detected, the synchronization operation will continue into that pool, expecting data entities 100 in need of synchronization. Cases (F) and (G) will always be treated as conflict resolution with merging, resulting in an incremented data entity version number 170.

The invention claimed is:

1. A method for encrypted data synchronization, wherein the method comprises:
 storing a data entity on a first device, said data entity comprising data content, accompanying metadata comprising a message authentication code (MAC) usable for an integrity check and including an entity key usable for encrypting the data content, and synchronization metadata comprising a data entity version number and usable for synchronizing the data entity between the first device and a second device, wherein at least the entity key of the accompanying metadata and the synchronization metadata are encrypted using a synchronization key synchronized between the first device and the second device, and wherein the synchronization key is encrypted by a master key securely shared between the first device and the second device:
 synchronizing, by the first device, the data entity with the second device using the synchronization metadata, wherein synchronizing the data entity with the second device using the synchronization metadata comprises:
  decrypting the synchronization metadata using the synchronization key without decrypting the data content; and
  determining whether a first data entity version number comprised within the decrypted synchronization metadata matches a second data entity version number stored on the second device,
 wherein an updated version of the data entity and the second data entity version number are loaded onto the first device from the second device based on the first data entity version number not matching the second data entity version number, and
 wherein the updated version of the data entity is stored on the second device based on a determination that the first data entity version number matches the second data entity version number, and further based on a determination that the data entity has been updated locally by the first device;
 generating and transferring a group key, by the first device to at least one third device, to form a read-only sharing group with at least the first device, wherein the group key is usable for decrypting and encrypting at least the entity key of the at least one data entity and not the synchronization metadata.

2. The method of claim 1, wherein a public key of the at least one third device is used to encrypt the group key and wherein the public key is shared between at least the first device and the at least one third device.

3. The method of claim 1, wherein the accompanying metadata comprises a delete flag.

4. The method of claim 1, wherein the synchronization metadata comprises a data entity identification number, a data entity version number, and/or a synchronization MAC.

5. The method of claim 4, wherein the data entity identification number is built from a device identification number and a device counter.

6. The method of claim 4, wherein the data entity version number is built from a device identification number and a counter.

7. The method of claim 1, wherein the at least one data entity is stored on a server.

8. The method of claim 1, wherein the synchronization key, the master key, and/or the group key are key sets comprising a plurality of keys.

9. A non-transitory computer readable memory medium, wherein the memory medium stores:
 a data entity comprising data content, accompanying metadata comprising a message authentication code (MAC) usable for an integrity check and including an entity key usable for encrypting the data content, and synchronization metadata comprising a data entity version number and usable for synchronizing the data entity between at least two first devices, wherein synchronizing the data entity between at least the two first devices using the synchronization metadata comprises decrypting the synchronization metadata using the synchronization key without decrypting the data content, and determining whether a first data entity version number comprised within the decrypted synchronization metadata matches a second data entity version number, wherein an updated version of the data entity and the second data entity version number are loaded onto a first one of the at least two first devices from a second one of the at least two first devices based on the first data entity version number not matching the second data entity version number, and wherein the updated version of the data entity is stored on the second one of the at least two first devices from the first one of the at least two first devices based on the first data entity version number matching the second data entity version number; and
 program instructions executable to:
  encrypt at least the entity key of the accompanying metadata and the synchronization metadata using a synchronization key synchronized between the two first devices, wherein the synchronization key is encrypted by a master key securely shared between the two first devices; and
  generate and transfer a group key to at least one second device to form a read-only sharing group with at least one of the two first devices, wherein the group key is usable for decrypting and encrypting at least the entity key of the data entity and not the synchronization metadata.

10. The non-transitory computer readable memory medium of claim 9, wherein the memory medium further stores program instructions executable to encrypt the group key using a public key of at least one of the second devices; wherein the public key is shared between the first and second devices.

11. The non-transitory computer readable memory medium of claim 9, wherein the accompanying metadata comprises a message authentication code MAC usable for an integrity check.

12. The non-transitory computer readable memory medium of claim 9, wherein the accompanying metadata comprises a delete flag.

13. The method of claim 1, wherein the at least one third device comprises the second device.

\* \* \* \* \*